United States Patent
Li et al.

(10) Patent No.: US 9,268,469 B2
(45) Date of Patent: Feb. 23, 2016

(54) IMAGE DISPLAY ENVIRONMENT

(71) Applicant: Google Inc., Mountain View, CA (US)

(72) Inventors: Hongyi Li, San Francisco, CA (US); Lena Elizabeth Cardell, San Francisco, CA (US); Eric F. Steinlauf, Cambridge, MA (US)

(73) Assignee: Google Inc., Mountain View, CA (US)

( * ) Notice: Subject to any disclaimer, the term of this patent is extended or adjusted under 35 U.S.C. 154(b) by 465 days.

(21) Appl. No.: 13/796,741

(22) Filed: Mar. 12, 2013

(65) Prior Publication Data

US 2014/0149940 A1     May 29, 2014

Related U.S. Application Data

(60) Provisional application No. 61/730,356, filed on Nov. 27, 2012.

(51) Int. Cl.
*G06F 3/0484*     (2013.01)
*G06F 3/0485*     (2013.01)

(52) U.S. Cl.
CPC .......... *G06F 3/04842* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 6,545,687 B2 * | 4/2003 | Scott et al. .................... | 345/629 |
| 6,738,079 B1 * | 5/2004 | Kellerman et al. ........... | 715/763 |
| 6,826,727 B1 * | 11/2004 | Mohr et al. ................... | 715/235 |
| 7,607,150 B1 | 10/2009 | Kobayashi et al. | |
| 8,645,851 B1 * | 2/2014 | Milne ............................ | 715/762 |
| 2005/0094206 A1 * | 5/2005 | Tonisson ...................... | 358/1.18 |
| 2005/0223319 A1 * | 10/2005 | Ohashi et al. ................. | 715/517 |
| 2006/0284852 A1 * | 12/2006 | Hofmeister et al. .......... | 345/173 |
| 2007/0174790 A1 * | 7/2007 | Jing et al. ...................... | 715/838 |
| 2007/0209025 A1 * | 9/2007 | Jing et al. ...................... | 715/968 |
| 2008/0005668 A1 | 1/2008 | Mavinkurve et al. | |
| 2008/0077569 A1 | 3/2008 | Lee et al. | |

(Continued)

FOREIGN PATENT DOCUMENTS

KR     10-2012-0033859     4/2012

OTHER PUBLICATIONS

Schöch, "A GUI-based Interaction Concept for Efficient Slide Layout," Mar. 2003, http://www.think-cell.com/en/pdf/think-cell_report_TC2003-01.pdf.*

(Continued)

*Primary Examiner* — Ryan Barrett
(74) *Attorney, Agent, or Firm* — Fish & Richardson P.C.

(57) ABSTRACT

Methods, systems, and apparatus for processing image content items. In one aspect, a method includes generating an image display environment for a first image content item on an image content item page resource between a first row and a second row of image content items. The user device expands a thumbnail of the image content item from first dimensions to second dimensions, and displays the expanded thumbnail in the image display environment. Concurrently with the thumbnail processing, the user device requests a first image resource referenced by the first image content item, and, upon receipt of the first image resource, generates an adjusted version of the first image resource that meets the second dimensions. The user device then displays the adjusted version of the first image resource in the image display environment in place of the expanded version of the first image content item.

15 Claims, 11 Drawing Sheets

(56) References Cited

U.S. PATENT DOCUMENTS

| | | | | |
|---|---|---|---|---|
| 2008/0270449 | A1* | 10/2008 | Gossweiler et al. | 707/102 |
| 2009/0204891 | A1* | 8/2009 | Hanechak | 715/247 |
| 2010/0188705 | A1* | 7/2010 | Giannetti et al. | 358/1.18 |
| 2011/0258204 | A1* | 10/2011 | Hubbard et al. | 707/749 |
| 2012/0278696 | A1* | 11/2012 | Carper et al. | 715/234 |
| 2012/0290566 | A1 | 11/2012 | Dasher et al. | |
| 2015/0100561 | A1* | 4/2015 | Li et al. | 707/706 |

OTHER PUBLICATIONS

McCarty, B., "Apple introduces iTunes 11, touting 29 billion song purchases across 63 countries" 2012 (online). [Retrieved on May 17, 2013]. Retrieved from the internet: http://thenextweb.com/apple/2012/09/12/apple-introduces-itunes-11-touting-29-billion-song-purchases-across-63-countries/>, 3 pages.

Google "in iTunes 11" Images (online). [Retrieved on May 17, 2013] Retrieved from the internet: https://www.google.com/search?q=in+iTunes+11&rls=com.microsoft:en-us:IE-Address&rlz=1I7GGNI_enUS489&source=lnms&tbm=isch&sa=X&ei=wEqVUZ_JK4Ls8gT6vICYBA&ved=0CAoQ_AUoAQ&biw=1437&bih=814#imgrc=bBbDI9vNHRFo6M%3A%3BC7laZNUMNwuy2M%3Bhttp%-253A%252F%252Fcdn.slashgear.com%252Fwp-content%252Fuploads%252F2012%252F11%252Fsg_itunes_111.jpg%3Bhttp%253A%252F%252Fwww.slashgear.com%252Fitunes-11-launches-with-complete-ui-redesign-and-icloud-abundance-29258959%252F%3B1090%3B714, 11 pages.

International Search Report and Written Opinion in International Application No. PCT/US2013/071671, mailed Apr. 1, 2014, 12 pages.

All Boots for Men/DSW DSW Designer Shoe Warehouse (online) (retrieved on Sep. 25, 2013) retrieved from internet: http://www.dsw.com/mens-shoes/collection/boots/cat20303/page-1/, 3 pages.

* cited by examiner

IMAGE DISPLAY ENVIRONMENT

CROSS-REFERENCE TO RELATED APPLICATIONS

This application claims the benefit under 35 U.S.C. §119 (e) of U.S. patent application Ser. No. 61/730,356, entitled "IMAGE DISPLAY ENVIRONMENT," filed Nov. 27, 2012, which is incorporated herein by reference in its entirety.

BACKGROUND

This specification relates to information presentation.

The Internet provides access to a wide variety of resources. For example, digital image files, video and/or audio files, as well as web pages for particular subjects or particular news articles, are accessible over the Internet. These digital files can be managed in a variety of ways. For example, users may create curated sets of images content items. Each image content item is a representative image, such as a thumbnail, of an image resource, and links to an image resource. Selection of the image content item causes a user device to request the image resource.

Another example is the processing of image search results. A variety of search engines are available for identifying particular resources accessible over the Internet. For example, digital images that satisfy a user's informational need can be identified by an image search process in which keywords or other data are processed to identify collections of digital images. Each image is identified to the user by an image search result. An image search result references a corresponding image resource that a search engine determines to be responsive to a search query, and typically includes a representative image of the image resource, such as a thumbnail. The image search result also references a page resource that includes the image resource.

SUMMARY

In general, one innovative aspect of the subject matter described in this specification can be embodied in methods that include the actions of monitoring for an expansion command for a first image content item, the first image content item being one of a plurality of image content items displayed in a plurality of rows and columns in an image content item page resource, each image content item referencing a corresponding image resource and including a representative image of the image resource; in response to the expansion command of the first image content item that includes a first representative image of first dimensions: generating an image display environment on the image content item page resource between a first row and a second row of image content items, wherein the first image content item is included in one of the first and second rows, and the second row is immediately subsequent to the first row; generating an expanded version of the first representative image from the first representative image, the expanded version being of second display dimensions that are greater than first display dimensions; displaying the expanded version of the first representative image in the image display environment; requesting a first image resource referenced by the first image content item, the first image resource being of third display dimensions that are different from the first and second display dimensions; in response to receiving the first image resource, generating an adjusted version of the first image resource, the adjusted version of the first image resource being of the second dimensions; and displaying the adjusted version of the first image resource in the image display environment in place of the expanded version of the first representative image. Other embodiments of this aspect include corresponding systems, apparatus, and computer programs, configured to perform the actions of the methods, encoded on computer storage devices.

Another innovative aspect of the subject matter described in this specification can be embodied in methods that include the actions of requesting an image content item page resource that includes a plurality of image content items to be displayed in a plurality of rows and columns, each image content item referencing a corresponding image resource and including a representative image of the image resource, and wherein the request specifies that a first image content item from among the plurality of image content items has been selected by an expansion command; generating an image display environment in the image content item resource, the image display environment being of at least one dimensions equal to a viewport dimension of a viewport in which the image content items are to be displayed; requesting a first image resource referenced by the first image content item; in response to receiving the first image resource, displaying the first image resource in the image display environment; requesting image content items for at least a first row of image content items and a second row of image content items; and in response to receiving the image content items for at least the first row of image content items and the second row of image content items: adjusting the dimensions of the image display environment so that at least a first portion of each image content item in the first row is displayed at a top of a viewport and at least a second portion of each image content item in the second row is displayed at a bottom of the viewport. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter of this application solves the technical problem of visual latency when an image display environment is opened for an in-line display of an image referenced by an image content item. This makes for a more fluid user experience, as the user immediately sees a representation of the image in the image display environment instead of a "blank" space during the time it takes to request, receive and resize the image referenced by the image content item.

Additionally, a user can quickly review a number of image search results in the context of other search results to decide which image search result best satisfies the user's informational need. This facilitates a contextual analysis of image search results by the user, and eliminates the need for the user to open multiple display tabs or active windows to review the search results.

Likewise, the processing of a bookmarked search results resource prioritizes the processing of an image display environment over the image search results. The prioritization of the rendering of the image display environment over the rendering of image search results in the presentation of information that is consistent with the viewer's emphasis (or sender's emphasis, if the sender is different from the viewer). This also makes for a more fluid user experience, as the viewer is not distracted by the population of numerous search results before the image display environment is processed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
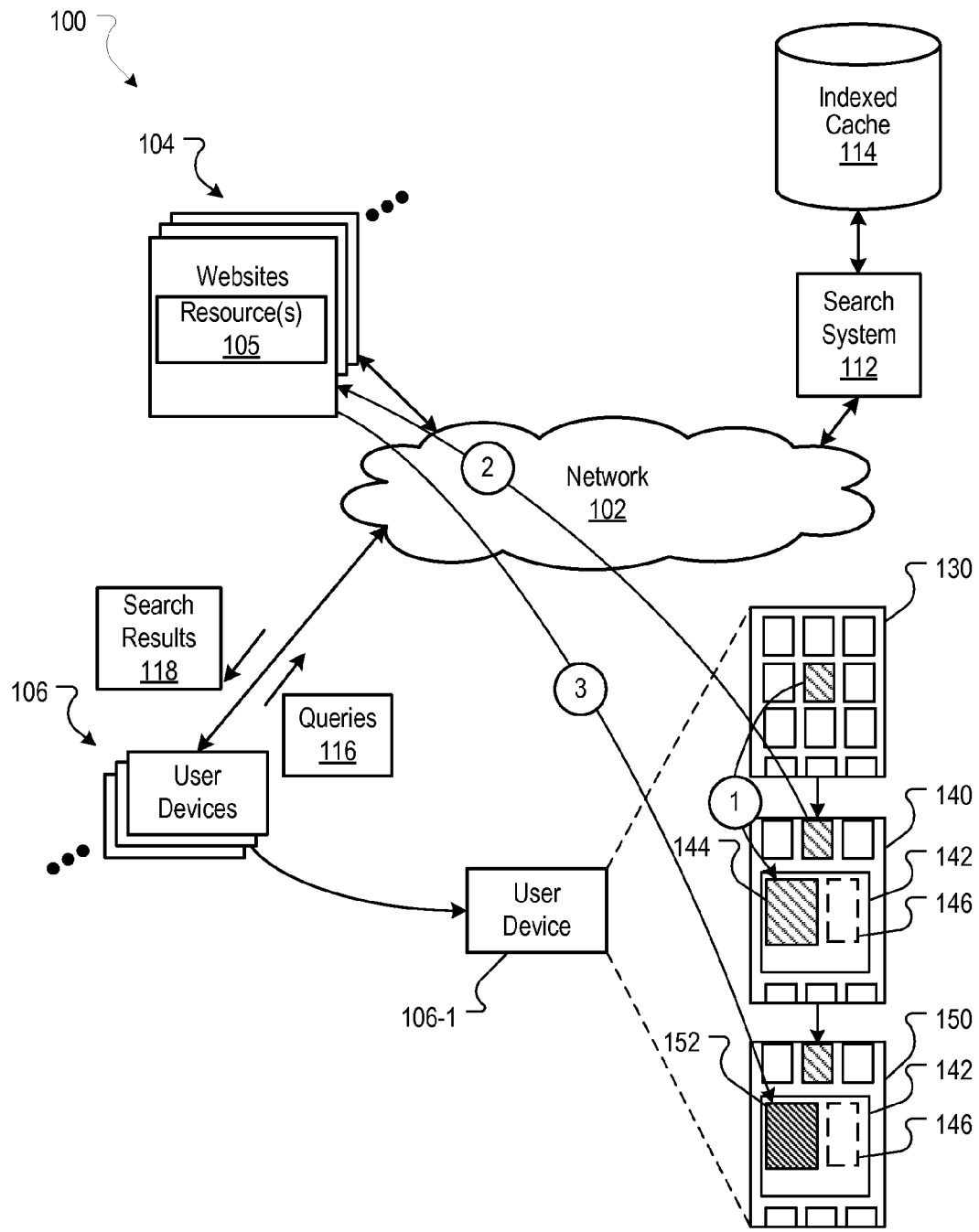
FIG. 1 is a block diagram of an example environment in which image search results are processed.

An image content item includes a representation of an image, the URL of the image, and the URL of a web page that includes the image. The representation of the image, can, for example, be a scaled version of the image, such as a thumbnail. A collection of image content items arranged in rows and columns are shown on an image content item page resource in a user device application, such as a browser. For example, in the case of image search results, the image content items are image search results. Alternatively, in the case of a user collection, the image content items define a curated set of image thumbnails of images, and each image thumbnail links to the image depicted by the image thumbnail.

Throughout this document, example implementations are described in the context of an image search operation. However, the subject matter of this application is applicable to any set of image content items that include a representation of an image and that link to the images they represent, and thus is not limited to image search result processing.

The browser includes instructions that are executed by the user device. The instructions cause the browser to monitor for an expansion command for one of the image search results ("a first image search result"). In response to monitoring expansion command of the first image search result, the user device generates an image display environment on the search results page resource between a first row and a second row of image search results. Typically, the first row is the row that includes the first image search result, and the second row is the row immediately below the first row (i.e., the next row without an intervening row). The user device expands the thumbnail from first height and width dimensions to second height and width dimensions, and displays the expanded thumbnail in the image display environment. Concurrently with the thumbnail processing, the user device requests a first image resource referenced by the first image search result, and, upon receipt of the first image resource, generates an adjusted version of the first image resource that meets the second dimensions. The user device then displays the adjusted version of the first image resource in the image display environment in place of the expanded version of the first representative image.

When processing a bookmarked search results resource for which a search result has been selected to be viewed with a corresponding image display environment, the image display environment is sized such that it takes up the active viewport. The image referenced by the selected search result is requested and displayed in the image display environment, and search result data that are referenced in the bookmarked search results resource are requested from the search provider. When the search result data are received, the image display environment is resized such that the image display environment is displayed between a first row of image search results and a second row of image search results.

The processing of the image content items is described in more detail below.

Example Environment

FIG. 1 is a block diagram of an example environment 100 in which systems implementing the subject matter of this written description are implemented. A network 102, such as a local area network (LAN), a wide area network (WAN), the Internet, or a combination thereof, connects websites 104, user devices 106, and a search system 112.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource 105 can be any data that can be provided over the network 102. A resource 105 can be identified by a resource address that is associated with the resource 105. Resources include HTML pages, images, portable document format (PDF) documents, videos, and feed sources, to name only a few. Additionally, resources such as web page resources can, in turn, reference other resources such as images so that when the web page resource is rendered on a user device, the referenced image is also displayed.

A user device 106 is an electronic device that is under control of a user and is capable of requesting and receiving resources over the network 102. Example user devices 106 include personal computers, mobile communication devices, e.g., smartphones, and other devices that can send and receive data over the network 102. A user device 106 typically includes one or more user applications, such as a web browser, to facilitate the sending and receiving of data over the network 102. By use of these applications, a user device 106 can request resources 105 from a website 104. In turn, the resource 105 can be provided to the user device 106 for presentation by the user device 106.

To facilitate searching of these resources, a search system 112 identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

For images, the search system 112 utilizes image processing algorithms to identify multiple instances of the same image. The search system 112, in some implementations, then selects a representative image, e.g., a canonical image, that is used to represent each of the identical images, and associates the representative image with each of the underlying identical images. The underlying web page that is referenced in the image search result is determined at query time, as a particular query may include information that results in one particular web page being selected over other web pages that include the same image.

At query time, the user devices 106 submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. Each search result page typically includes multiple search results.

Processing Image Search Results

The processing of image search results on a user device is depicted with reference to the user device 106-1 and the three user interface representations 130, 140 and 150. The three user interface representations 130, 140 and 150 depict the progression from an image search results page the image search results page with the display of an in-line image display environment for a particular search result. As used herein, displaying an image display environment "in-line" means that the image display environment is displayed in an image search results page resource with at least one row of image search results simultaneously in a viewport area.

Figure 2A:
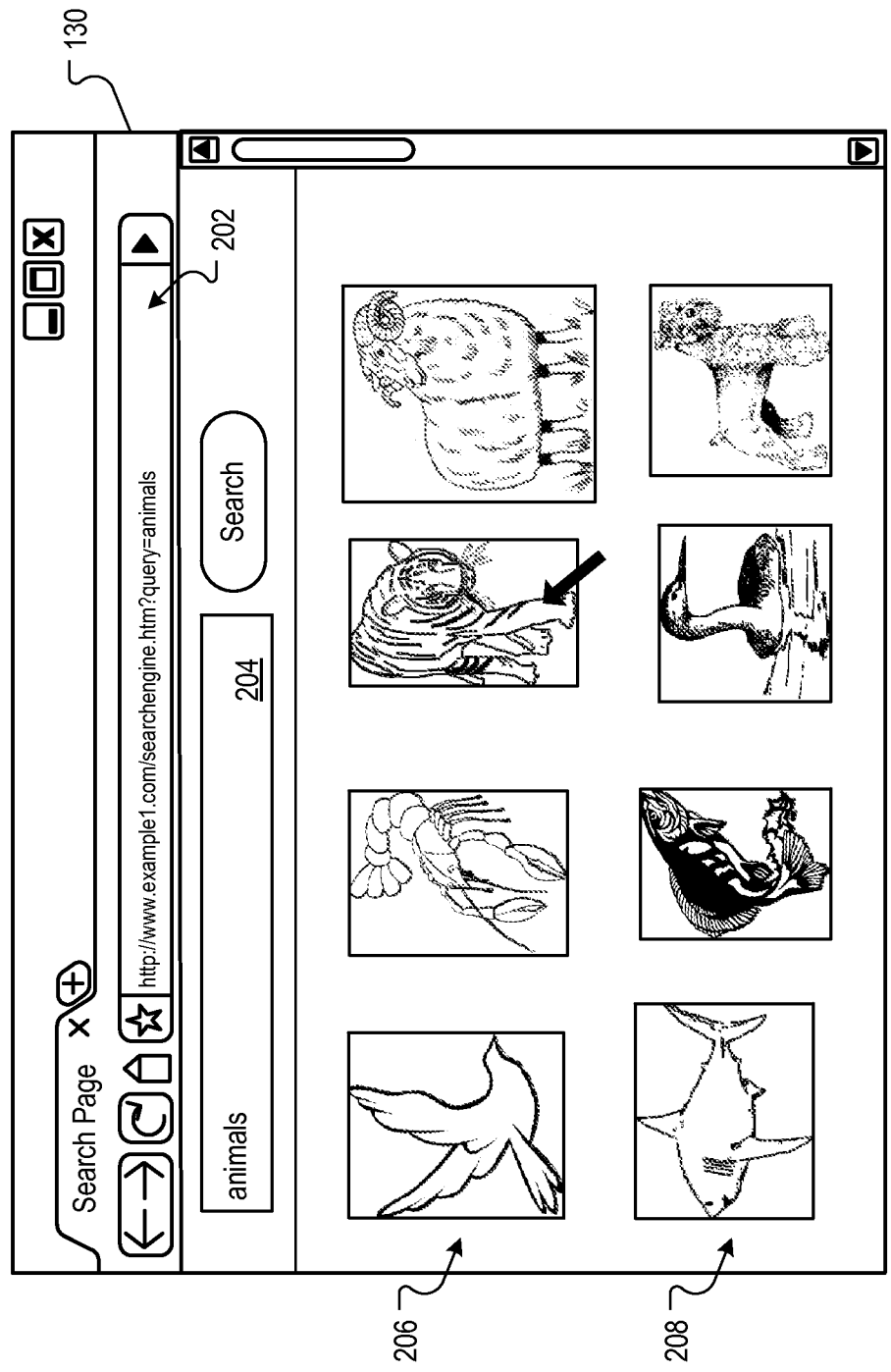
FIGS. 2A-2C are illustrations of example user interfaces presented during the processing of an image search result.
Figure 2B:
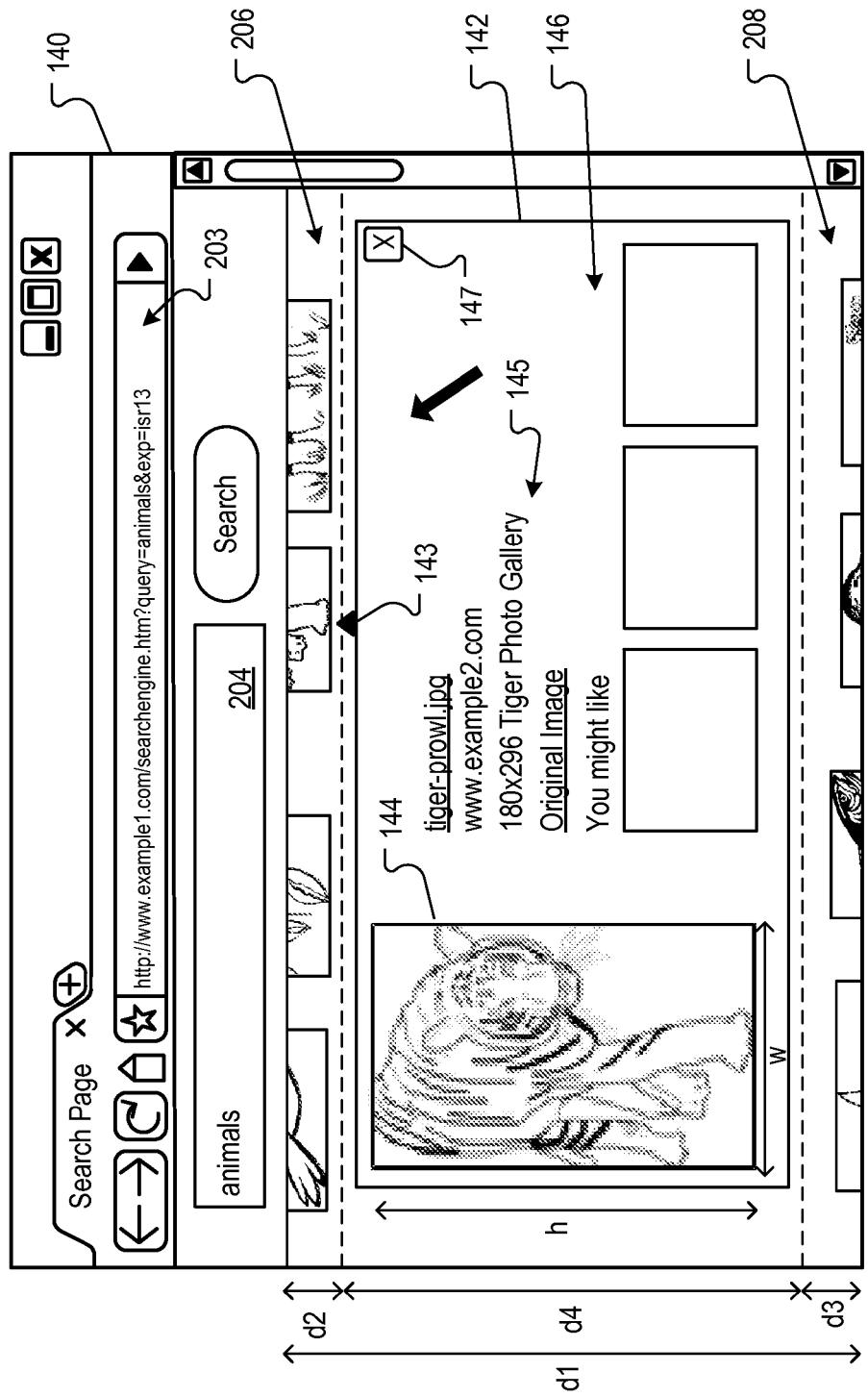
Figure 2C:
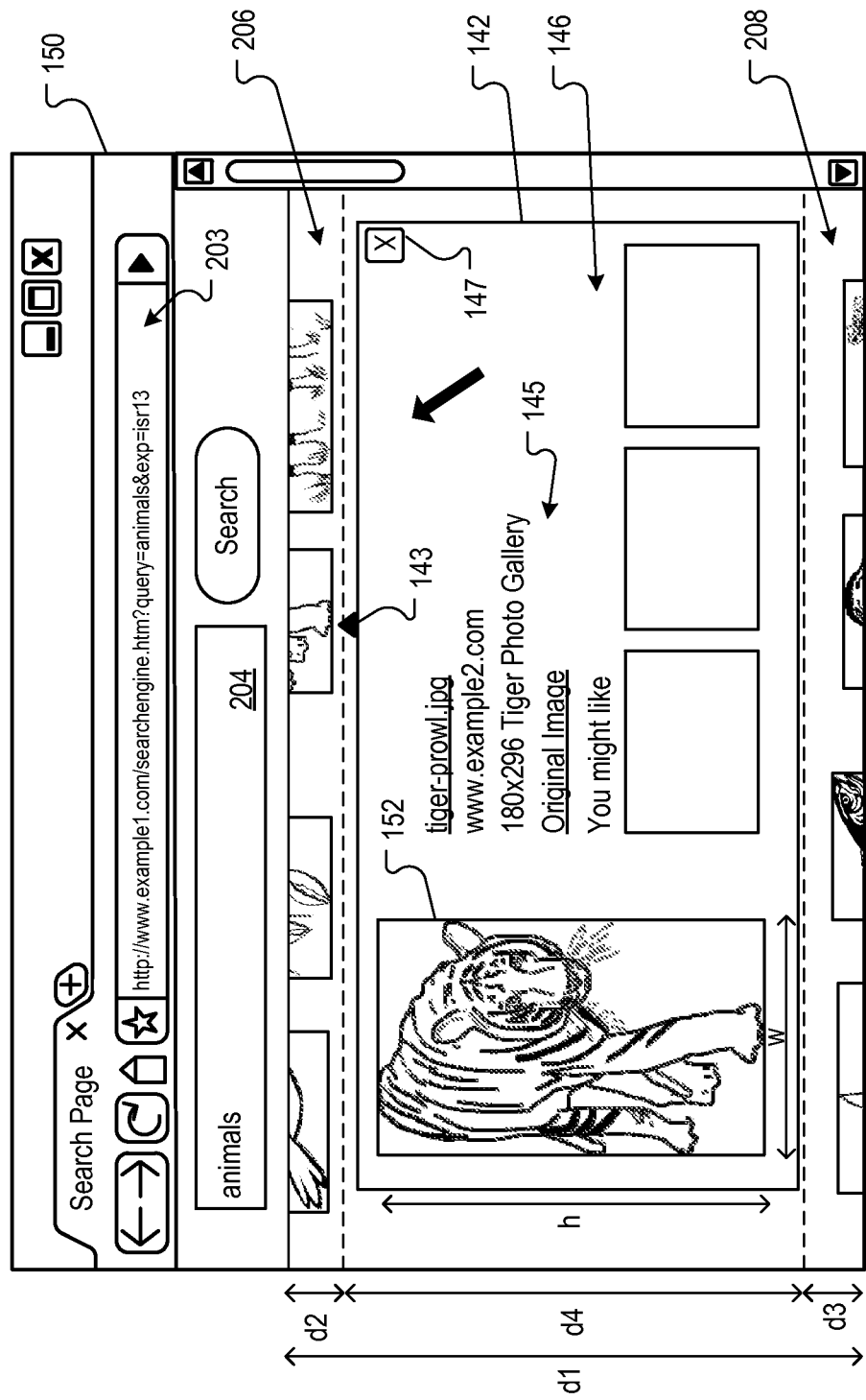
Figure 3A:
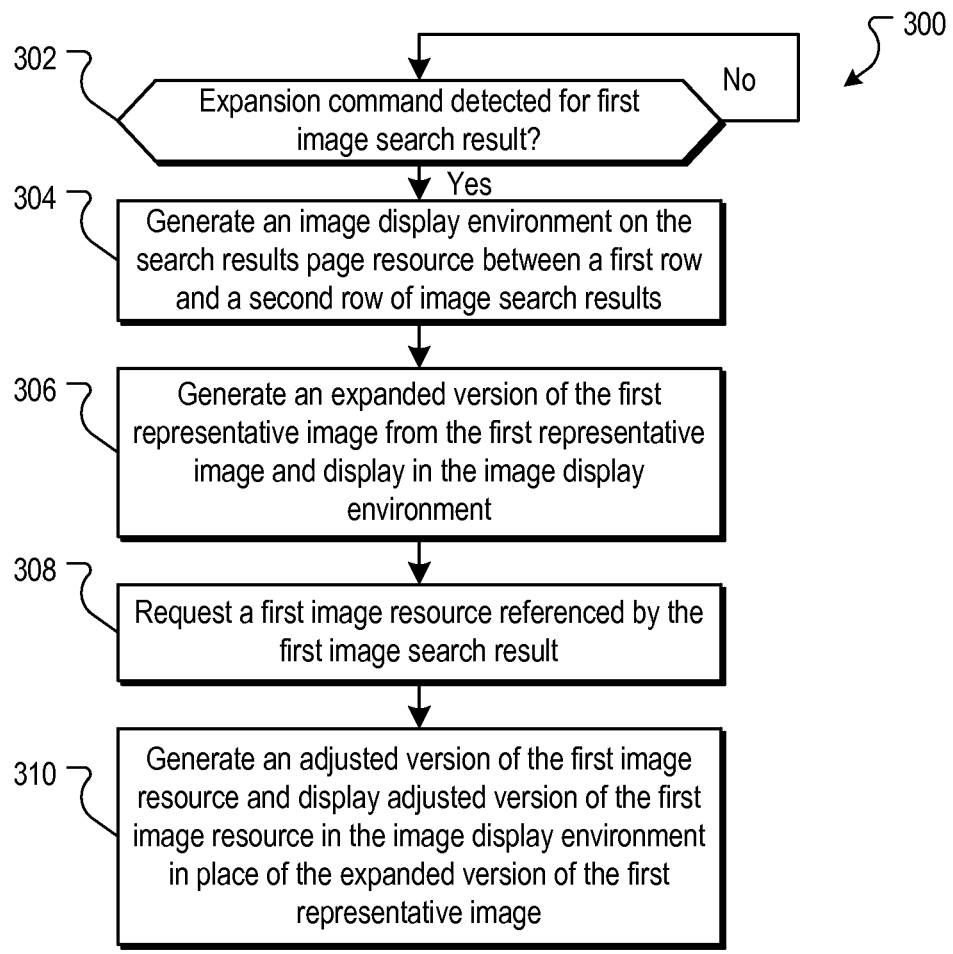
FIG. 3A is a flowchart of an example process for processing an image search result.

The user interface representations 130, 140 and 150 are shown in more detail in FIGS. 2A-2C, which are illustrations of the example user interfaces 130, 140 and 150 presented during the processing of an image search result. The process flow of FIGS. 2A-2C is also described in the context of FIG. 3A, which is a flowchart of an example process 300 for processing an image search result.

In response to a query, the search system 112 provides search results 118 to the user device 106-1. As depicted in the user interface 130 in FIG. 2A, the user device 106-1 is displaying a search results page 130. The example URL 202 represents the URL of the search results page 200 served by the search system 112. In response to the query 204 "animals", the search system 112 has provided image search results in the two rows—rows 206 and 208. Each image search result references a corresponding image resource that is determined to be responsive to a search query and includes a representative image of the image resource. Each representative image is of respective first dimensions, e.g., a respective first height and first width for each thumbnail. For example, each image shown in the search results page 200 may be a smaller version of a corresponding image provided by a website 104. Each search result references a page resource 105 that includes the image resource. The page resource may, in some situations, be the same as the image resource; alternatively, the page resource may be an HTML page that references the image resource so that when the HTML page is rendered on a user device, the image is displayed with additional content.

In some implementations, the browser application running on the user device 106-1 includes instructions that facilitate the processing of search results as described in more detail below. The instructions can be provided in a variety of different ways. For example, the instructions can be part of the browser executable, or alternatively can be provided by a browser plug-in, a toolbar application, or even provided in the form of a script with the search results page 130.

In operation, the instructions cause the user device 106-1 to monitor for an expansion command for a first image search result (302). For example, hovering over an image search result, or clicking on an image search result, results in the detection of an expansion command. Other appropriate interactive models can be used for an expansion command. As shown in FIG. 2A, the image search result that includes the tiger thumbnail receives an expansion command.

In response to the expansion command, the user device generates an image display environment on the search results page resource between a first row and a second row of image search results (304). For example, as shown in FIG. 2B, the image display environment 142 is generated between the first row 206 and the second row 208. An indicator 143 on the display environment border indicates the image search result in the first row to which the image display environment 142 corresponds. In some implementations, the image display environment 142 is generated by adjusting the rows of image search results so that at least a first portion of each image search result in the first row 206 is displayed at a top of a viewport and at least a second portion of each image search result in the second row 208 is displayed at a bottom of the viewport. As used in this specification, the viewport is the portion of the browser window in which image search results are displayed. The viewport may encompass the entire browser window, or may be a portion thereof. As shown in FIG. 2B, the viewport has a viewport height of d1.

The image display environment is displayed between the first row 206 and the second row 208 of image search results. In some implementations, the rows are adjusted such that there is at least a top gap between the top border of the environment 142 and the top border of the viewport, as indicated by the gap height d2, and at least a bottom gap between the bottom border of the environment 142 and the bottom border of the viewport, as indicated by the gap height d3. Accordingly, the environment 142 has a height of d4. The determination of the gap heights is described in the following section.

The user device generates expanded version 144 of the first representative image from the first representative image and displays the expanded version in the image display environment (306). The expanded version 144 is of second display dimensions that are greater than first display dimensions. For example, as shown in FIG. 2B, the expanded version 144 is of a second height h and second width w that are larger than the first height and first width of the representative image shown in FIG. 2A. The flow line with reference call out 1 in FIG. 1 indicates that the expanded version 144 is generated from the thumbnail included in the image search result.

The image display environment may also include additional data, such as image resource metadata 145 describing one or more features of the image resource referenced by the selected image search result. Example metadata includes the name of the image resource, a resource address of the image resource, and other appropriate metadata.

Other information can also be displayed in the environment 142. For example, image suggestions 146 can be displayed in the image display environment 142. Each image suggestion includes a representation of another image resource (e.g., a thumbnail) that is suggested based on the first image resource.

As described above, the user device 106, concurrently with the processing of the thumbnail, requests a first image resource referenced by the first image search result (308). The request is indicated in FIG. 1 by the flow line with reference call out 2. In some implementations, the image resource referenced by the image search result is not hosted by the search engine; instead, the image resource is hosted by a publisher that belongs to a second domain that is different from the first domain of the search engine. Thus, the request for the first image resource is sent to a server that belongs to a second domain.

When the image is received by the user device, as indicated by the flow line with reference call out 3, the user device generates an adjusted version 152 of the first image resource and displays adjusted version of the first image resource in the image display environment in place of the expanded version of the first representative image (310). For example, the image resource may be of third display dimensions that are different from the first and second display dimensions, e.g., the third display dimensions may be larger than the first and second display dimensions. The adjusted version 152 of the first image resource being of the second dimensions, however, so that the adjusted version 152 may be swapped for the expanded version 144.

For example, with reference to FIG. 2C, the adjusted version 152 is shown in the environment 150. Because the adjusted version is generated from the image resource that is larger the representative image, the pixilation artifact is not present. Using the representative image in the image search result as a proxy for the actual image that is referenced by the image search result while awaiting the actual image makes for a more fluid user experience, as the user immediately sees a representation of the image in the image display environment instead of a "blank" space during the time it takes to request, receive and resize the image referenced by image search result.

In FIGS. 2B and 2C, the indicator indicates the image search result to which the image display environment corresponds. Selecting another image search result in the top row 206 will cause the process steps described above to be repeated so that the image display environment is updated for the newly selected image search result. Likewise, the indicator 143 will shift to the newly selected image search result.

In some implementations, if an image search result in the bottom row is selected, the indicator shifts to the bottom of the image display environment 142 and the process steps described above to be repeated so that the image display environment is updated for the newly selected image search result. In an alternate implementation, the image display environment 142 closes, and the search results are adjusted so that a portion of the second row of image search results is at the top of the viewport, and a portion of the next subsequent row of image search results, e.g., a third row, is displayed at the bottom of the viewport. The image display environment 142 is then regenerated with an updated image.

Size and Placement of the Image Display Environment

The image display environment 142 may be positioned below (or, alternatively, above) an image search result to which it corresponds. The dimensions of the environment 142 are determined, in part, based on the viewport height d1 and the corresponding top and bottom gap sizes. In some implementations, the height of the image display environment 142 is calculated based on fixed top and bottom gap sizes. For example, the fixed gap sizes, in terms a pixel display units, may be 50 pixels for both the top and bottom gaps, and the height of the image display environment 142 is determined by the difference of viewport height d1 and the top and bottom gaps, e.g., Display Height=Viewport Height−Top Gap−Bottom Gap In another implementations, the display height may vary according to a minimum gap size and a fraction multiple. For example, the following algorithm can be used to generate a display height that varies in proportion to the viewport height and the fraction multiple:

Minimum Gap Height = mG
Target Image Display Environment Height = TIDEH
Environment Fraction Multiplier = EF
If Viewport Height < (mG + TIDEH), then:
    Image Display Environment Height (IDEH)= Viewport Height − mG
If Viewport Height >= (mG + TIDEH), then:
    IDEH = TIDEH + (Viewport height − mG − TIDEH)*EF The values for mG, TIDEH, and EF can vary. In some implementations, the minimum gap mG is less than target image display environment height TIDEH, and the fraction multiplier EF is less than unity. Once the image display environment height is determined, the height, and thus the corresponding width, of the expanded version 144 can be determined. For example, the height of the expanded version 144 of the representative image can be selected so that the expanded version 144 of the representative image fits within the image display environment 142.

In some implementations, the bottom gap may vary so long as it defines a minimum space between the bottom of the image display environment 142 and the bottom of the viewport. The bottom gap may be selected so as to leave a portion of the second row displayed in the viewport. For example, the following algorithm can be used to determine the size of the bottom gap:

Top And Bottom Gap Total = GapTot = T Viewport Height − IDEH
Minimum Bottom Gap = MinBotGap
Minimum Top Gap = MinTopGap
Max Bottom Gap = MaxBotGap
Gap Fraction Multiplier = GF
Bottom Gap = MinBotGap + (GapTot − MinBotGap − MinTopGap)*GF The values for MinBotGap, MinTopGap, MaxBotGap, and GF can vary. For example, MinBotGap may be less that MinTopGap, and MaxBotGap may also be less than MinTopGap. The gap fraction multiplier GF may be less than unity.

In another implementation, the resulting image display environment height (IDEH) is compared to a percentile capture image display environment height (PCIDEH) and one of these height values is selected for the image display environment. In variations of this implementation, the percentile capture image display environment height is a height of the image display environment in which, for a given width of the browser window, at least a given percentile of a set of images referenced by image search results can be displayed in the browser window without a cropping of the images within the given percentile.

Figure 3B:
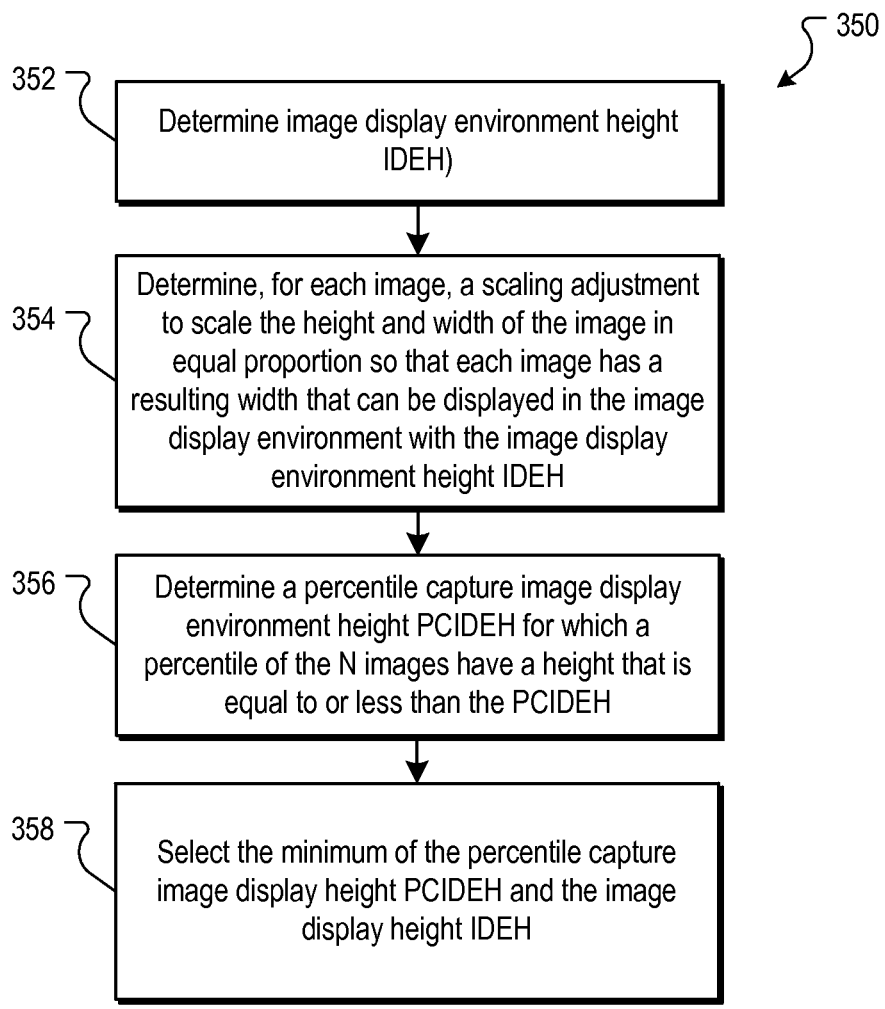
FIG. 3B is a flow diagram of an example process for selecting between an image display environment height and a percentile capture image display environment height.

FIG. 3B is a flow diagram of an example process 350 for selecting between an image display environment height as determined above and a percentile capture image display environment height. The process 350 can be performed by the search system 112.

The search system 112 determines the image display environment height (352). The image display environment height (IDEH) can be determined as described above.

To determine the percentile capture image display environment height, the search system 112 first determines the dimensions (height and width) of each image referenced for the first N search results (354). Typically N is selected to be at least a first set of search results that will populate an active viewport. In some implementations, N is selected to be a first set of search results that will populate the viewport for multiple scrolls, e.g., N can be 50, 100, or 200, etc. The height and width of each image are determined, for example, by accesses metadata describing the height and width of each image and stored in a data store, or by processing each image.

The search system 112 determines, for each image, a scaling adjustment to scale the height and width of the image in equal proportion so that each image has a resulting width that can be displayed in the image display environment with the image display environment height IDEH (356). Because the image dimensions are scaled according to their width, some of the scaled images may be of a scaled height that exceeds the image display environment height IDEH. For example, assume the image display environment height IDEH is determined to be 300 pixels, and the width of the browser viewport is 1100 pixels. Assume also that the maximum width (e.g., the second width w, as described above) is 500 pixels. A first image has a width of 2000 pixels and a height of 1000 pixels, and a second image has a width of 100 pixels and a height of 500 pixels. The first image is thus scaled to 500 pixels wide and 250 pixels high. Conversely, the second image is not scaled, as it has a width of 100 pixels, which is less than the maximum width of 500 pixels. As a result, the first image, with a height of 250 pixels, can be completely displayed within the image display environment with a height of 300 pixels, but the second image, with a height of 500 pixels, cannot.

The search system 112 determines a percentile capture image display environment height PCIDEH for which a percentile of the N images have a height that is equal to or less than the PCIDEH (358). For example, assume N=10, and the following adjusted heights, in ascending order, are as follows:

1000 pixels
420 pixels
400 pixels
300 pixels
253 pixels
200 pixels
200 pixels
198 pixels
192 pixels
188 pixels Assuming the percentile is 90%, a height of 420 pixels is selected as the PCIDEH.

The search system selects the minimum of the percentile capture image display height PCIDEH and the image display height IDEH (360). In the example above the IDEH value of 300 would be selected, as it is less than the value of 420.

By way of another example, assume the following adjusted heights, in ascending order, are as follows:

330 pixels
245 pixels
243 pixels
230 pixels
222 pixels
200 pixels
200 pixels
198 pixels
192 pixels
188 pixels In this example, for the percentile is 90%, a height of 245 pixels is selected as the PCIDEH, and because it is less than 300, the value of the IDEH, the value of 245 is used as the height of the image display environment.

In some implementations, the search system 112 can ensure that the selected image display environment is not less than a minimum height M_Height, e.g., $$H=\max(\text{Min\_Height}, \min(\text{IDEH}, \text{PCIDEH}))$$

The process 350 describe above ensures that the image display environment height is scaled for images that are relatively small as a group, e.g., for which a search for application icons results in many images that are less than 100 pixels in both height and width. Accordingly, the height of the image display environment is adjusted downward so that more image search results are shown in the browser window, and less display real estate is used as "dead space" in which nothing is displayed.

The image display environment 142 may be closed by selecting the close command 147. In some implementations, the image display environment 142 may also close in response to an implicit signal of a lack of user interest, e.g., when the user causes the user device to scroll down (or up) the search results resource such that the image display environment 142 is no longer in the viewport and remains out of the viewport at least for a threshold time period.

Figure 4:
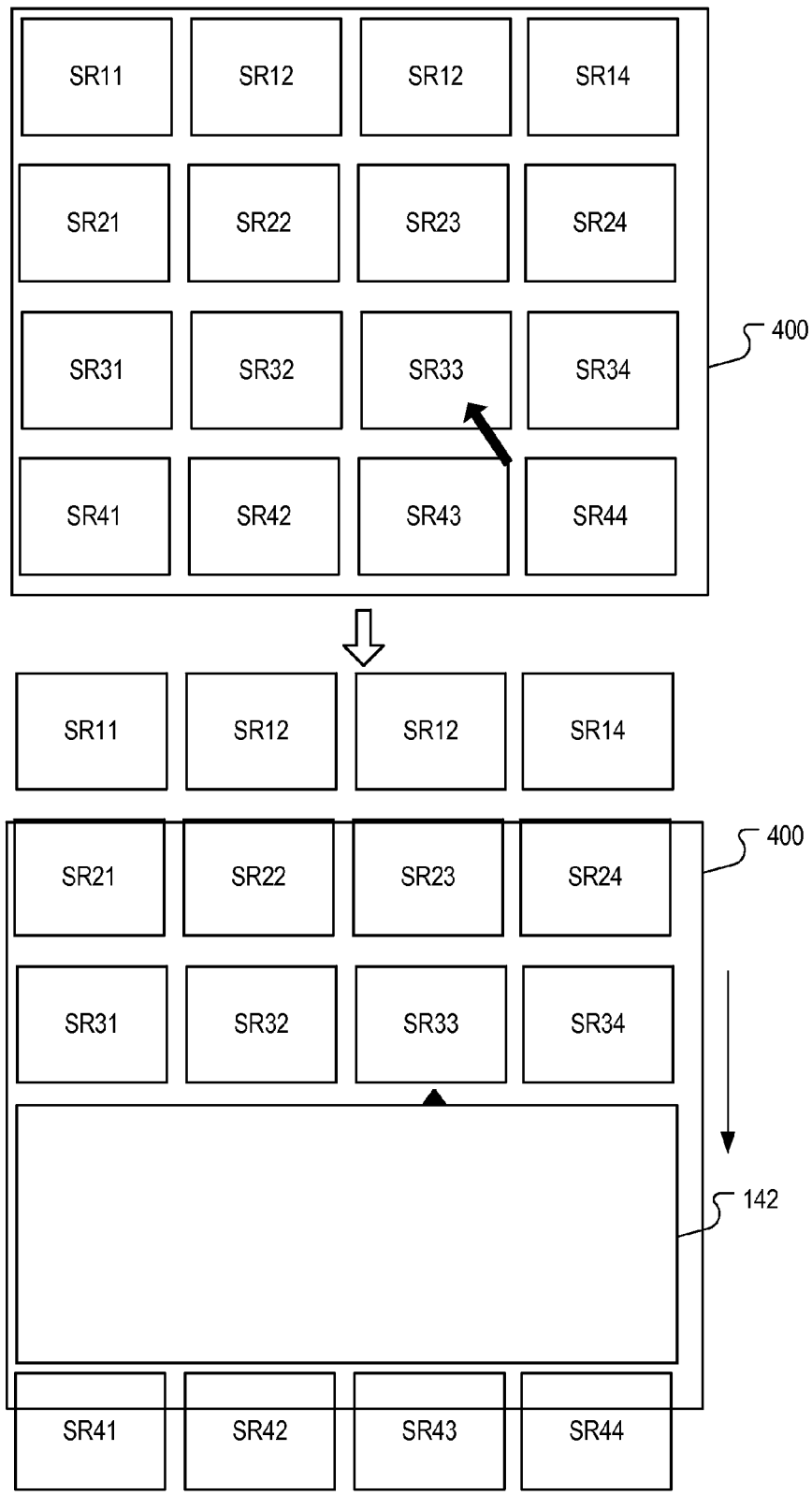
FIG. 4 is an illustration of a viewport scroll during the processing of an image search result.

In some situations, the user device may automatically scroll the viewport in response to the opening or closing of the image display environment 142. FIG. 4 is an illustration of a viewport 400 scroll during the processing of an image search result. In the top section of the FIG. 4, the viewport 400 includes search results SR11-SR44. A cursor is positioned over search result SR33 and the search result SR33 receives an expansion command. In response, the user device generates the image display environment 142. Because the position of the viewport is such that the generation of the image display environment 142 below the search result SR33 would result in a portion of the image display environment 142 being rendered outside of the viewport, the viewport 400 is scrolled downward, as indicted in the bottom portion of FIG. 4. The viewport 400 is scrolled such that a portion of the next adjacent row below the row in which the search result SR33 is shown in the viewport. In some implementations, however, the viewport may be scrolled such that the bottom of the image display environment 142 is aligned with the bottom of the viewport 400.

When an image display environment 142 is displayed in the viewport 400, and the viewport 400 is scrolled downward to rows in the search results such that the image display environment 142 is no longer shown in the viewport and the image display environment 142 then closes, the viewport may scroll up to compensate for the closing of the image display environment 142. The upward scroll may be equal to the image display environment 142 height such that the user does not notice that viewport 400 has scrolled upward.

Bookmarked Resources with Activated Image Display Environment

Often a user may bookmark a resource for future reference or send a resource link to another user. In the situation in which an image display environment 142 is activated when the resource is bookmarked, the link to the resource may include a query parameter value (or some other appropriate data) indicating the activated image display environment 142 and the image content item for which the image display environment has been activated.

Figure 5:
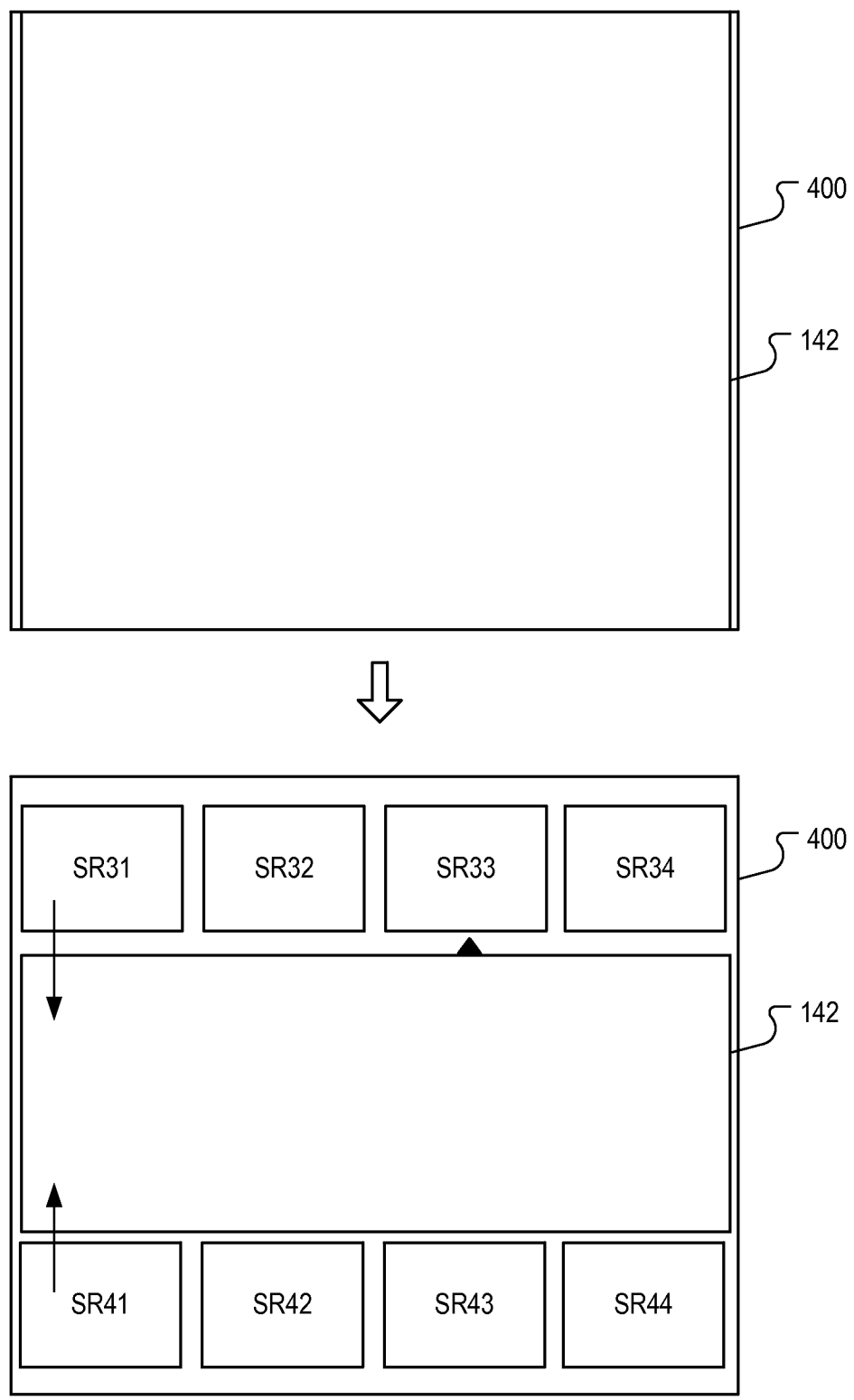
FIG. 5 is an illustration of processing in an image display environment for a search results resource request that indicates an image search result has been selected for an in-line view.
Figure 6:
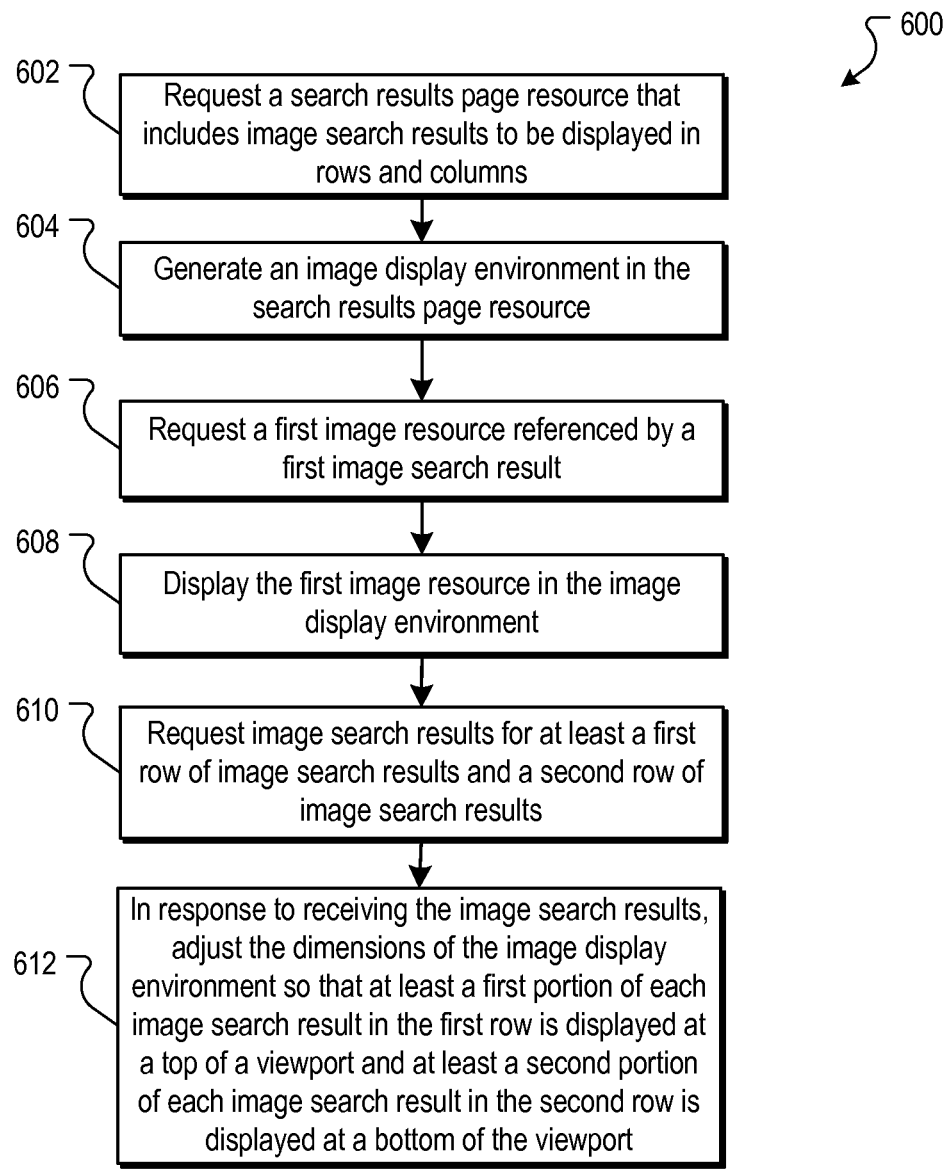
FIG. 6 is a flowchart of an example process for processing the search results resource request that indicates an image search result has been selected for an in-line view.

FIG. 5 is an illustration of processing in an image display environment for a search results resource request that indicates an image search result has been selected for an in-line view. The description of FIG. 5 is also described with reference to FIG. 6, which is a flowchart of an example process 600 for processing a search results resource request that indicates an image search result has been selected for an in-line view.

The user device requests a search results page resource that includes image search results to be displayed in rows and columns (602). The request specifies that a first image search result from among the image search results has been selected by an expansion command. For example, a link to the search results page may include a query parameter that specifies a particular search result has received an expansion command, such as shown in FIGS. 2B and 2C, which depicts the URL with a query parameter "exp=isr13" indicating an expansion for the third search result in the first row.

The user device generates an image display environment in the search results page resource (604). The image display environment is of at least one dimension equal to a viewport dimension of a viewport in which the image content items are to be displayed. For example, as shown in FIG. 5, the image display environment 142 is of a height that is equal to the height of the viewport 400. In another implementation, the image display environment 142 need not have a dimension that is equal to a viewport dimension; instead, the dimensions of the image display environment are such that other image content items are not shown in the viewport 400. For example, the height and width of the image display environment may have top, bottom and side gaps from the viewport 400 borders of 10 pixels.

The user device requests a first image resource referenced by a first image search result (606), and displays the first image resource in the image display environment (608) after receiving the first image resource. The first image resource may be resized by the user device to fit within the image display environment.

The user device also requests image search results for at least a first row of image search results and a second row of image search results (610). For example, the user device may request from a search engine the image thumbnails referenced by thumbnail links in the image search results.

In response to receiving the image search results, the user device adjusts the dimensions of the image display environment so that at least a first portion of each image search result in the first row is displayed at a top of a viewport and at least a second portion of each image search result in the second row is displayed at a bottom of the viewport (612). For example, as shown in FIG. 5, the height of the image display environment 142 is reduced, and a first top row of image search results and a second bottom row of image search results transition into the viewport 400.

The gaps, image display environment height, and scrolling operations may be determined as described above.

Reducing Viewport Scroll Artifacts

Often a user may reposition a viewport so that a top row of images search results for which an image display environment is displayed is partially excluded from the viewport. In such situations, a user may select another image search result to be displayed in the image display environment. However, repositioning the image display environment 142 within the viewport 400 after each selection could be distracting for a user. Accordingly, in some implementations, the viewport is not scrolled in response to a new image from a row being rendered in the image display environment 142 when the environment 142 is not obscured. This is shown in FIG. 7, which is an illustration of processing an image display environment 142 after an adjustment of the viewport by the user.

Figure 7:
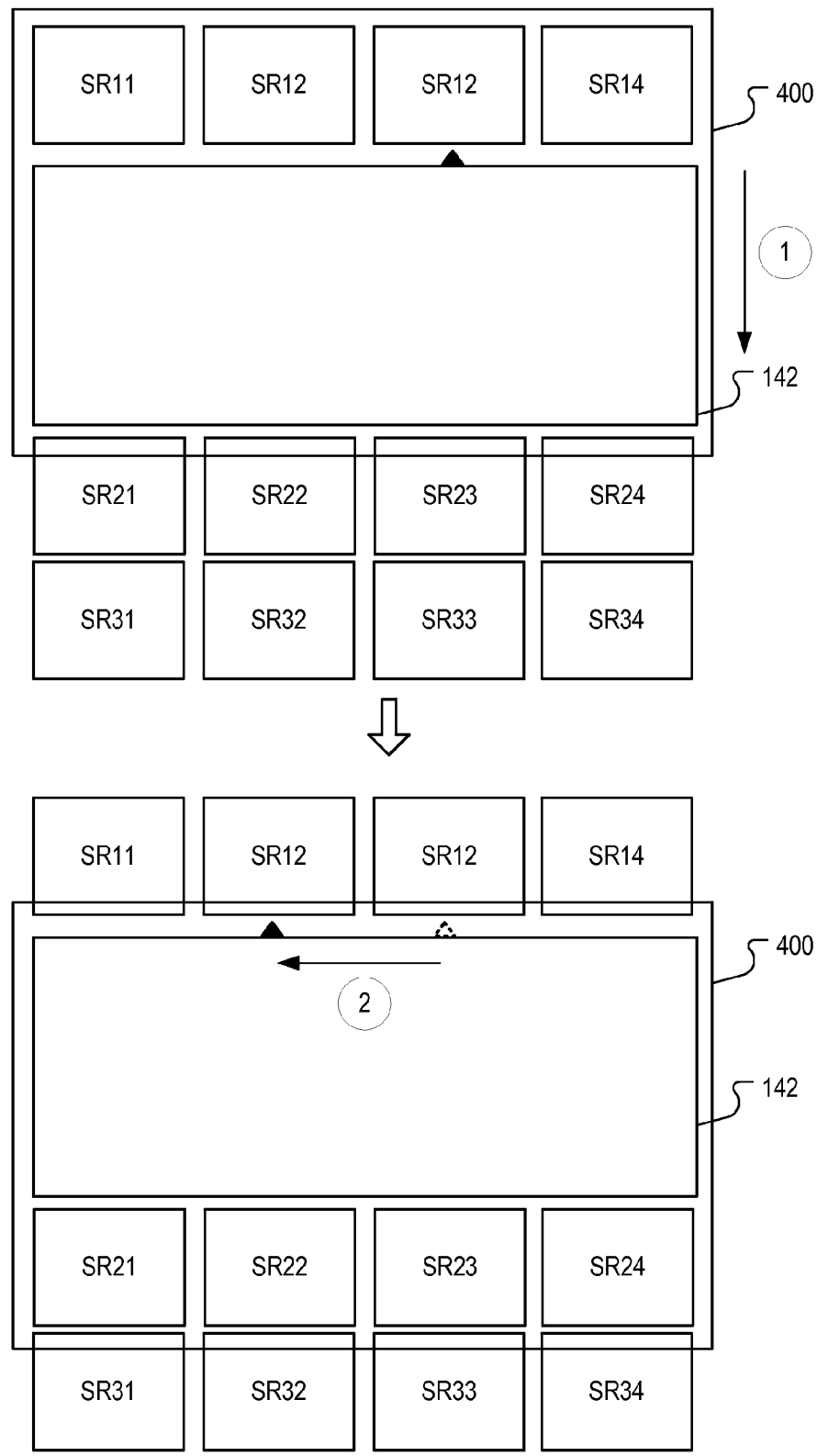
FIG. 7 is an illustration of processing an image display environment after an adjustment of the viewport by the user.

In FIG. 7, the user, after selecting image search result SR12 for display in the image display environment, moves the viewport down by a scrolling action, as indicted by flow arrow 1. For example, the user may desire to view the image search results SR21-SR24, but maintain the focus of the image display environment 142 on the search results SR11-SR14. Thereafter, the user may select image search result SR12 for display in the image display environment 142, e.g., by use of a keyboard arrow or by a mouse click on the bottom portion of the search result SR12. However, the user device does not reposition the viewport to the first state shown in the top FIG. 3; instead, because the image display environment is not obscured, the viewport 400 remains stationary relative to the search results.

Figure 8:
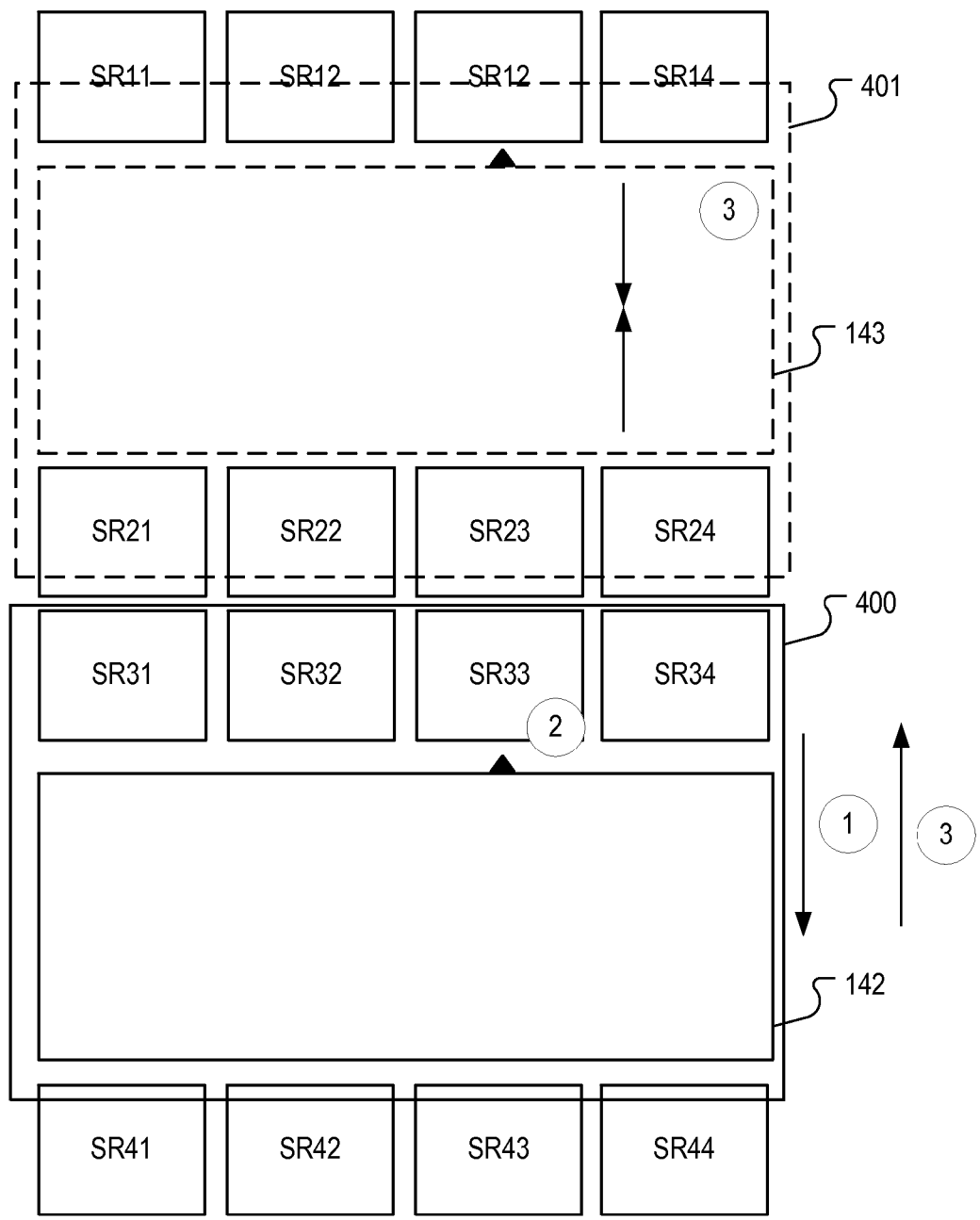
FIG. 8 is an illustration of a compensation scroll of the viewport in response to the closing of a first image display environment and the opening of a second image display environment.

FIG. 8 is an illustration of a compensation scroll of the viewport in response to the closing of a first image display environment and the opening of a second image display environment. The compensation scroll allows for the viewport to appear to be "stationary" when an image display environment that is outside and above the viewport collapses. This results in what appears to be an undisturbed transition to a new image display environment.

In FIG. 8, the display is initially displaying the phantom viewport 400' and the phantom image display environment 142'. The user then moves the viewport 400 so that a new row of search results SR31-SR34 are displayed at the top of the viewport 400, as indicated by flow arrow 1. The phantom image display environment 142' is thus outside of the viewport 400. Thereafter, the user selects search result SR33 for display in an image display environment, as indicated by flow element 2. In response, the image display environment 142' collapses and the image display environment 142 is opened. However, the collapse of the image display environment 142' would cause the search results to scroll upward in the viewport 400. Accordingly, the viewport 400 undergoes an upward scroll that is simultaneous with the collapse of the image display environment 142', as indicated by the simultaneous flow elements 3 the depict the collapse of the image display environment 142' and the scrolling of the viewport 400. This results in the viewport 400 and the search results SR31-SR34 maintaining fixed positions relative to each other.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device. Data generated at the user device, e.g., a result of the user interaction can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:

monitoring, by a data processing apparatus, for an expansion command for a first image content item, the first image content item being one of a plurality of image content items displayed in a plurality of rows and columns in an image content item page resource, each image content item referencing a corresponding image resource and including a representative image of the image resource;

in response to the expansion command of the first image content item that includes a first representative image of first display dimensions:

generating, by the data processing apparatus, an image display environment on the image content item page resource between a first row and a second row of image content items, wherein the first image content item is included in one of the first and second rows, and the second row is immediately subsequent to the first row, the generating comprising:

determining a viewport height, the viewport height being a measure of display units from a top of the viewport to a bottom of the viewport;

determining whether the viewport height is less than a sum of a minimum gap height and a target image display environment height;

if the viewport height is less than the sum of the minimum gap height and the target image display environment height, then setting an image display environment height of the image display environment proportional to a difference of viewport height and the minimum gap height;

if the viewport height is not less than the sum of the minimum gap height and the target image display environment height, then setting the image display environment height of the image display environment proportional to the difference of the target image display environment height and fraction multiple of the difference of the viewport height and the sum of the minimum gap height and the target image display environment height; and determining second display dimensions based at least in part on the image display environment height;

generating an expanded version of the first representative image from the first representative image, the expanded version being of the second display dimensions that are greater than first display dimensions;

displaying the expanded version of the first representative image in the image display environment;

requesting a first image resource referenced by the first image content item, the first image resource being of third display dimensions that are different from the first and second display dimensions;

in response to receiving the first image resource, generating an adjusted version of the first image resource, the adjusted version of the first image resource being of the second dimensions; and displaying the adjusted version of the first image resource in the image display environment in place of the expanded version of the first representative image.

2. The method of claim 1, wherein each image content item is an image search result that is determined to be responsive to a search query, and the image content item page resource is an image search results page resource.

3. The method of claim 2, wherein generating the image display environment on the image content item page resource between a first row and a second row of image content items comprises:

adjusting the rows of image search results so that at least a first portion of each image search result in the first row is displayed at a top of a viewport and at least a second portion of each image search result in the second row is displayed at a bottom of the viewport; and wherein the image display environment is displayed between the first row of image search results and the second row of image search results.

4. The method of claim 3, wherein adjusting the rows of image search results comprises separating the first row and the second row by a vertical distance that is at least equal to the image display environment height.

5. The method of claim 4, wherein adjusting the rows of image search results further comprises:

determining a gap total that is proportional to the difference of the viewport height and the image display environment height; and determining a bottom gap height that is proportional to a sum of a minimum bottom gap height and fraction multiple of a difference of the gap total and a sum of the minimum bottom gap height and a minimum top gap height.

6. The method of claim 5, wherein a sum of the minimum bottom gap height and the minimum top gap height is equal to the minimum gap height.

7. The method of claim 2, further comprising displaying image resource metadata in the image display environment, the image resource metadata describing one or more features of the first image resource.

8. The method of claim 2, further comprising displaying image suggestions in the image display environment, each image suggestion including a representation of another image resource that is suggested based on the first image resource.

9. The method of claim 1, wherein the image content item page resource is provided by server that belongs to a first domain, and the request for the first image resource is sent to a server that belongs to a second domain that is different from the first domain.

10. A system, comprising:
a data processing apparatus; and
a non-transitory computer readable storage device storing instructions executable by the data processing apparatus and that upon such execution cause the data processing apparatus to perform operations comprising:
monitoring for an expansion command for a first image content item, the first image content item being one of a plurality of image content items displayed in a plurality of rows and columns in an image content item page resource, each image content item referencing a corresponding image resource and including a representative image of the image resource;
in response to the expansion command of the first image content item that includes a first representative image of first dimensions:
generating an image display environment on the image content item page resource between a first row and a second row of image content items, wherein the first image content item is included in one of the first and second rows, and the second row is immediately subsequent to the first row, the generating comprising:
determining a viewport height, the viewport height being a measure of display units from a top of the viewport to a bottom of the viewport;
determining whether the viewport height is less than a sum of a minimum gap height and a target image display environment height;
if the viewport height is less than the sum of the minimum gap height and the target display environment height, then setting an image display environment height of the image display environment proportional to a difference of viewport height and the minimum gap height;
if the viewport height is not less than the sum of the minimum gap height and the target image display environment height, then setting the image display environment height of the image display environment proportional to the difference of the target image display environment height and fraction multiple of the difference of the viewport height and the sum of the minimum gap height and the target image display environment height; and
determining second display dimensions based at least in part on the image display environment height;
generating an expanded version of the first representative image from the first representative image, the expanded version being of the second display dimensions that are greater than first display dimensions;
displaying the expanded version of the first representative image in the image display environment;
requesting a first image resource referenced by the first image content item, the first image resource being of third display dimensions that are different from the first and second display dimensions;
in response to receiving the first image resource, generating an adjusted version of the first image resource, the adjusted version of the first image resource being of the second dimensions; and
displaying the adjusted version of the first image resource in the image display environment in place of the expanded version of the first representative image.

11. The system of claim 10, wherein each image content item is an image search result that is determined to be responsive to a search query, and the image content item page resource is an image search results page resource.

12. The system claim 11, wherein generating the image display environment on the image content item page resource between a first row and a second row of image content items comprises:
adjusting the rows of image search results so that at least a first portion of each image search result in the first row is displayed at a top of a viewport and at least a second portion of each image search result in the second row is displayed at a bottom of the viewport; and
wherein the image display environment is displayed between the first row of image search results and the second row of image search results.

13. The system of claim 11, further comprising displaying image resource metadata in the image display environment, the image resource metadata describing one or more features of the first image resource.

14. The system of claim 10, wherein the image content item page resource is provided by server that belongs to a first domain, and the request for the first image resource is sent to a server that belongs to a second domain that is different from the first domain.

15. A non-transitory computer readable storage device storing instructions executable by a data processing apparatus and that upon such execution cause the data processing apparatus to perform operations comprising:
monitoring, by a data processing apparatus, for an expansion command for a first image content item, the first image content item being one of a plurality of image content items displayed in a plurality of rows and columns in an image content item page resource, each image content item referencing a corresponding image resource and including a representative image of the image resource;
in response to the expansion command of the first image content item that includes a first representative image of first display dimensions:
generating, by the data processing apparatus, an image display environment on the image content item page resource between a first row and a second row of image content items, wherein the first image content item is included in one of the first and second rows, and the second row is immediately subsequent to the first row, the generating comprising:
determining a viewport height, the viewport height being a measure of display units from a top of the viewport to a bottom of the viewport;
determining whether the viewport height is less than a sum of a minimum gap height and a target image display environment height;
if the viewport height is less than the sum of the minimum gap height and the target image display environment height, then setting an image display environment height of the image display environment proportional to a difference of viewport height and the minimum gap height;
if the viewport height is not less than the sum of the minimum gap height and the target image display environment height, then setting the image display environment height of the image display environment proportional to the difference of the target image display environment height and fraction multiple of the difference of the viewport height and the sum of the minimum gap height and the target image display environment height; and determining second display dimensions based at least in part on the image display environment height;

generating an expanded version of the first representative image from the first representative image, the expanded version being of the second display dimensions that are greater than first display dimensions;

displaying the expanded version of the first representative image in the image display environment;

requesting a first image resource referenced by the first image content item, the first image resource being of third display dimensions that are different from the first and second display dimensions;

in response to receiving the first image resource, generating an adjusted version of the first image resource, the adjusted version of the first image resource being of the second dimensions; and displaying the adjusted version of the first image resource in the image display environment in place of the expanded version of the first representative image.

\* \* \* \* \*